July 25, 1950  V. M. SETTERHOLM ET AL  2,516,154
FIXTURE
Filed March 21, 1947

INVENTORS
VERNON M. SETTERHOLM
BY DOUGLAS B. SEVIN

M. O. Hayes

ATTORNEY

Patented July 25, 1950

2,516,154

UNITED STATES PATENT OFFICE 2,516,154

FIXTURE

Vernon M. Setterholm, Rochester, N. Y., and Douglas B. Sevin, Norwichtown, Conn.

Application March 21, 1947, Serial No. 736,186

4 Claims. (Cl. 248—361)

(Granted under the act of March 3, 1883, as amended April 30, 1928; 370 O. G. 757)

This invention relates to improvements in fixtures, and more particularly to improvements in clamps.

In many installations of instruments, such as in the installation of a panel-mounted synchro comprising a cylindrical casing having an eccentric ring into which a rearwardly disposed mounting ring is set, it is extremely difficult to obtain access to the eccentric and mounting rings for purposes of adjustment. Particularly in submarine installations of synchros, the instrument is apt to slip out of desired position while conventional securing clamps are being tightened by blind manipulation.

For example, at present L-shaped friction clamps are used generally to clamp synchros to the equipment of which they form a part. In one method of mounting employed, three separate clamps hold the eccentric ring. Each clamp is actuated by a screw driven into a tapped hole in the mounting plate. In another method, six clamps are used, three to secure the eccentric ring to the equipment in the manner above described and three to secure the mounting ring of the synchro to the eccentric.

Neither of these methods of mounting is satisfactory. After the synchro has been positioned properly, the three clamps must be drawn up tight by blind manipulation, and at the same time the positioning must be maintained. In installations where only three clamps are used, adjustment is especially difficult, for the eccentric ring is then loosened and the gear mesh can be changed easily while the synchro stator is being rotated for bearing alignment.

The subject device overcomes these difficulties. Comprising a horseshoe-shaped clamp and two clamp posts therefor, the device provides a single adjusting screw, that can be located for easy access and that holds the eccentric ring and the synchro mounting ring in position firmly.

The primary object of the invention is to provide a clamp of simple and durable construction adapted to secure an object to a standard.

Another object is to provide a clamp adapted to secure an object such as a synchro ring to a standard.

A further object is to provide a clamp operable by manipulation of a single accessible member to secure frictionally an object such as a synchro ring between said clamp and a standard.

Another object is to provide a clamp adapted to engage frictionally opposite portions of an object such as a synchro ring against a standard.

Figure 1:
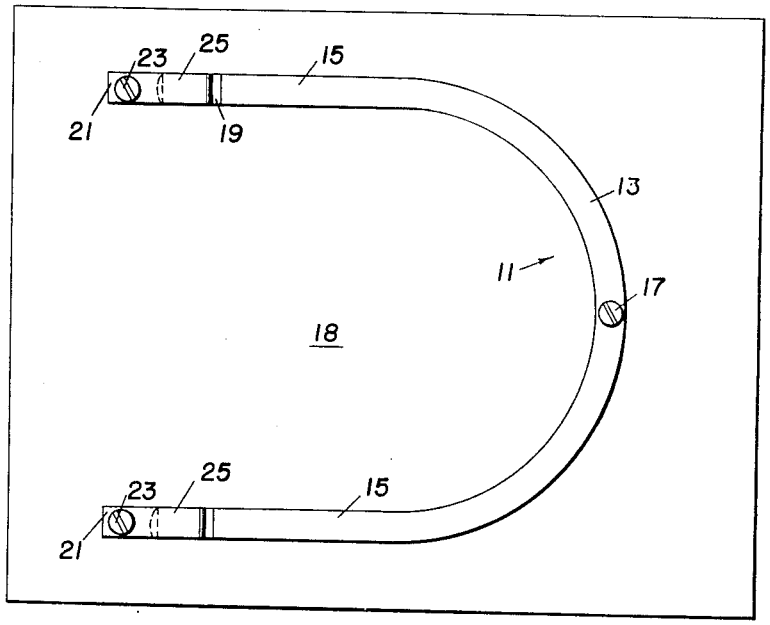
Figure 2:
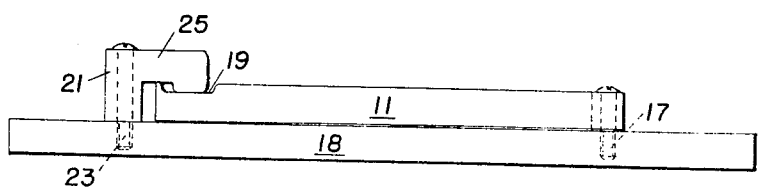

Further objects and advantages of this invention, as well as its construction, arrangement and operation will be apparent from the following description and claims in connection with the accompanying drawing, in which Fig. 1 is a plan view of a clamp, showing a preferred embodiment of the invention; and Fig. 2 is an elevation thereof.

Similar numerals refer to similar parts throughout the several views.

A U-shaped bar 11, preferably made of steel, comprises an arcuate portion 13 defining a hemicycle and leg portions 15 extending from the ends thereof. A hole medial the faces of said arcuate portion carries a screw -17 adapted to secure said bar to a suitable standard 18 and recesses 19 on a face of the leg portions 15 proximate the ends thereof distal said arcuate portion are adapted to receive lugs hereinafter described.

Posts 21 are each provided with tapped holes which carry screws 23 that mount said posts on standard 18, and with integral lug arms 25 adapted to engage the bar 11 at the recesses 19 when said bar and said posts are mounted on the standard 18.

When it is desired to secure an object such as a synchro ring to the standard 18, the posts 21 are mounted on said standard by means of the screws 23 and the bar 11 mounted on said standard by means of the screw 17 so that each of the recesses 19 thereof is disposed between its associated lug arm 25 and the standard 18. An object such as a synchro ring positioned between the bar 11 and the standard 18 is secured therebetween by tightening the screw 17 and is released therefrom by retracting said screw 17: The horseshoe-shaped clamp applies pressure to the synchro mounting-ring at two points diametrically opposite each other, and is secured by a single screw 17 that can be located for easiest accessibility. The synchro zeroing procedure then consists merely in loosening said screw until the synchro will turn, with light friction, to zero position and then retightening said screw. When tightened, the eccentric ring having been first adjusted for proper gear mesh, the screw prevents the eccentric ring from rotating while the synchro is being zeroed. The U-shaped bar 11, being constrained at three points, applies stable pressure both along and across the diameter of the synchro ring.

Various modifications and changes can be made in the subject device without departing from the scope of the invention.

The invention described herein may be manufactured and used by or for the Government of the United States of America for governmental purposes without the payment of any royalties thereon or therefor.

We claim:

1. A clamp comprising a U-shaped bar secured removably to a standard by a screw disposed medial the arcuate portion of said bar and spaced posts secured to said standard, said posts having lug arms adapted to restrict movement of the leg portions of said bar relative said standard.

2. A clamp comprising a U-shaped bar secured removably to a standard by a screw disposed medial the arcuate portion of said bar, said bar having recesses proximate the ends of the leg portions of said bar on the face thereof distal said standard, and spaced posts secured to said standard, said posts having lug arms engaging said recesses and adapted to restrict movement of said leg portions relative said standard.

3. A clamp comprising a U-shaped bar secured removably to a standard by means disposed medial the arcuate portion of said bar and spaced posts secured to said standard, said posts having lug arms adapted to restrict movement of the leg portions of said bar relative said standard.

4. A clamp comprising a U-shaped bar secured removably to a standard by means disposed medial the arcuate portion of said bar, said bar having recesses proximate the ends of the leg portions of said bar on the face thereof distal said standard, and spaced posts secured to said standard, said posts having lug arms engaging said recesses and adapted to restrict movement of said leg portions relative said standard.

VERNON M. SETTERHOLM.
DOUGLAS B. SEVIN.

REFERENCES CITED

The following references are of record in the file of this patent:

UNITED STATES PATENTS

| Number | Name | Date |
| --- | --- | --- |
| 449,039 | Flietsch | Mar. 24, 1891 |
| 603,025 | Lord | Apr. 26, 1891 |
| 1,742,253 | Jacobi | Jan. 7, 1930 |
| 1,941,753 | Plies | Jan. 2, 1934 |